(12) United States Patent
Pruden

(10) Patent No.: US 8,890,032 B2
(45) Date of Patent: Nov. 18, 2014

(54) PROPELLER HEATER LEAD

(75) Inventor: Gary L. Pruden, Somers, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 849 days.

(21) Appl. No.: 12/884,597

(22) Filed: Sep. 17, 2010

(65) Prior Publication Data
US 2012/0138588 A1 Jun. 7, 2012

(51) Int. Cl.
H05B 1/00 (2006.01)
B64C 11/02 (2006.01)
B64D 15/12 (2006.01)

(52) U.S. Cl.
CPC ............... B64D 15/12 (2013.01); B64C 11/02 (2013.01)
USPC ........................................................ 219/201

(58) Field of Classification Search
CPC .................................. B64C 11/02; B64D 15/12
USPC ........... 174/74 R, 86, 110 V, 119 R; 219/200, 219/201, 202, 527, 528, 529, 535, 536; 416/1, 30, 37, 39, 95; 244/134 R, 134 A, 244/134 B, 134 C, 134 D, 134 E, 134 F
See application file for complete search history.

(56) References Cited

U.S. PATENT DOCUMENTS

| 2,444,557 | A | | 7/1948 | Eaton |
| 3,644,703 | A | * | 2/1972 | Nelson ......................... 219/201 |
| 4,386,749 | A | | 6/1983 | Sweet et al. |
| 5,131,812 | A | | 7/1992 | Boyd et al. |
| 5,767,605 | A | | 6/1998 | Giamati |
| 6,137,082 | A | | 10/2000 | Pruden et al. |
| 6,194,685 | B1 | | 2/2001 | Rutherford |
| 6,269,876 | B1 | * | 8/2001 | De Rouffignac et al. ....... 166/60 |
| 6,358,006 | B1 | * | 3/2002 | Weyandt et al. ................. 416/39 |
| 6,753,513 | B2 | | 6/2004 | Goldberg et al. |
| 6,906,537 | B2 | | 6/2005 | Goldberg et al. |
| 7,124,983 | B2 | | 10/2006 | Chow et al. |
| 7,604,202 | B2 | | 10/2009 | Froman et al. |

* cited by examiner

Primary Examiner — Dana Ross
Assistant Examiner — Joseph Iskra
(74) Attorney, Agent, or Firm — Carlson, Gaskey & Olds, P.C.

(57) ABSTRACT

Heater leads for a leading edge resistive heating element are configured to accommodate the relative movement of the propeller blades to adjust propeller blade pitch. The heater leads each include a static portion and a dynamic portion. The static portion remains fixed relative to the rotating propeller during operation and the dynamic portion moves with movements of the individual blades to adjust pitch. The length of the dynamic portion accommodates the limits of movement and includes features that provide the desired performance and operational life.

20 Claims, 3 Drawing Sheets

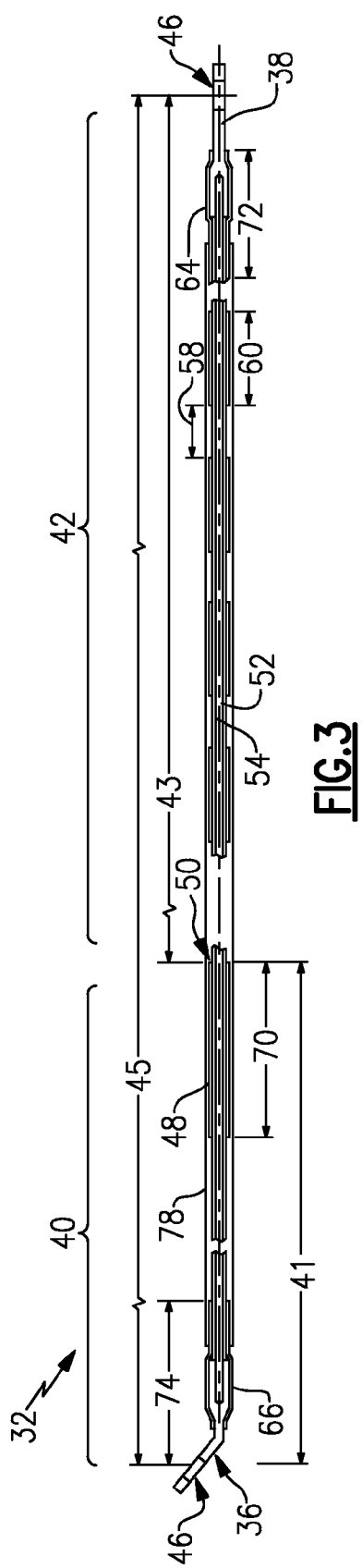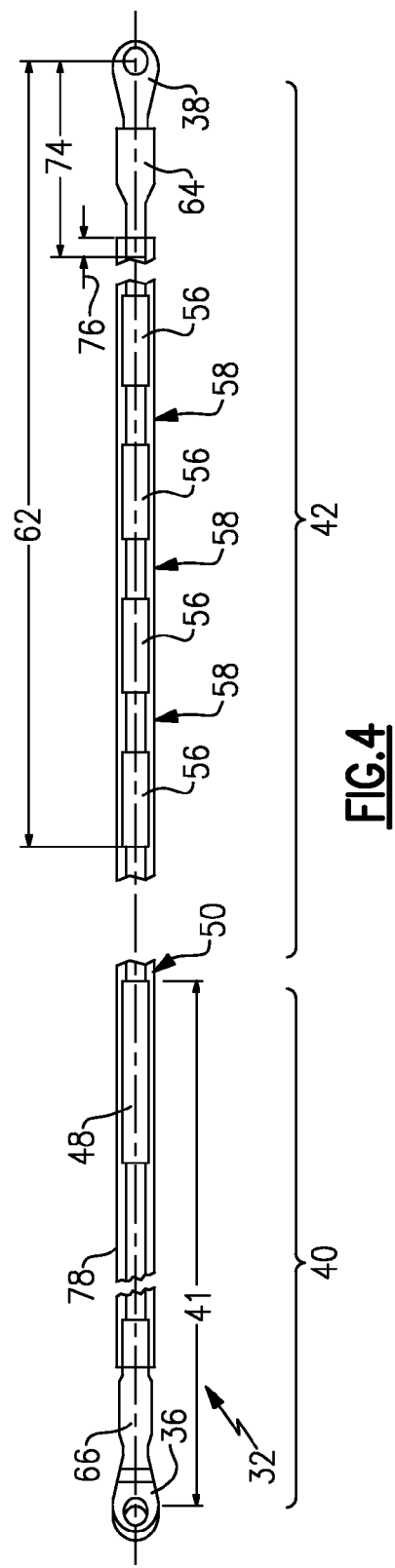
FIG.3
FIG.4

PROPELLER HEATER LEAD

The subject of this disclosure was made with government support under Contract No.: N00019-08-G-0002-XT01 CLIN 0006 awarded by the United States Navy. The government therefore has certain rights in the disclosed subject matter.

BACKGROUND

This disclosure generally relates to a blade leading edge heating system for a variable pitch propeller. More particularly, this disclosure relates to an electrical connection between relative moving components for the heating system of the variable pitch propeller.

A propeller assembly can include a plurality of individual blades that are rotatable to vary propeller pitch. The varying pitch provides additional control over the thrust produced during aircraft operation. A resistive heating element may be integrated into each blade for preventing ice build up. The resistive heating elements are imbedded in rubber mats bonded to the leading edge of each blade. Electrical energy required to power the resistive elements is communicated through leads from the propeller bulkhead mounted terminal to the retaining ring mounted terminal attached to the rotatable blade. Each of the electrical leads includes a dynamic portion that accommodates movement of the propeller blade. If the dynamic portion of the lead is too short, excessive strain can occur at the extremes of propeller blade movement. However, a lead that is too long will encounter excessive centrifugal forces and introduce the possibility of becoming entangled or caught on surrounding structures.

SUMMARY

A disclosed propeller assembly includes a plurality of blades rotated about a first axis. The propeller blades further pivot about a second axis that provides for changes to the propeller blade pitch. Each of the propeller blades include a leading edge on which is attached a resistive heating element. Electrical energy required to power the resistive elements are communicated through heater leads. The disclosed heater leads are configured to accommodate the relative movement of the propeller blades to adjust propeller blade pitch.

Each of the heater leads are attached to a bulkhead mounted slip ring terminal on one end and to a terminal disposed on a retaining ring that is attached and rotates with the blade during variable pitch operation. The heater leads each include a static portion and a dynamic portion. The static portion remains fixed relative to the rotating propeller during operation and the dynamic portion moves with movements of the individual blades to adjust pitch. Accordingly the length of the dynamic portion accommodates the limits of movement and includes features that provide the desired performance and operational life.

These and other features disclosed herein can be best understood from the following specification and drawings, the following of which is a brief description.

BRIEF DESCRIPTION OF THE DRAWINGS

FIG. 3 is a cross-sectional view of an example heater lead.
FIG. 4 is a top view of the example heater lead.

DETAILED DESCRIPTION

Figure 1:
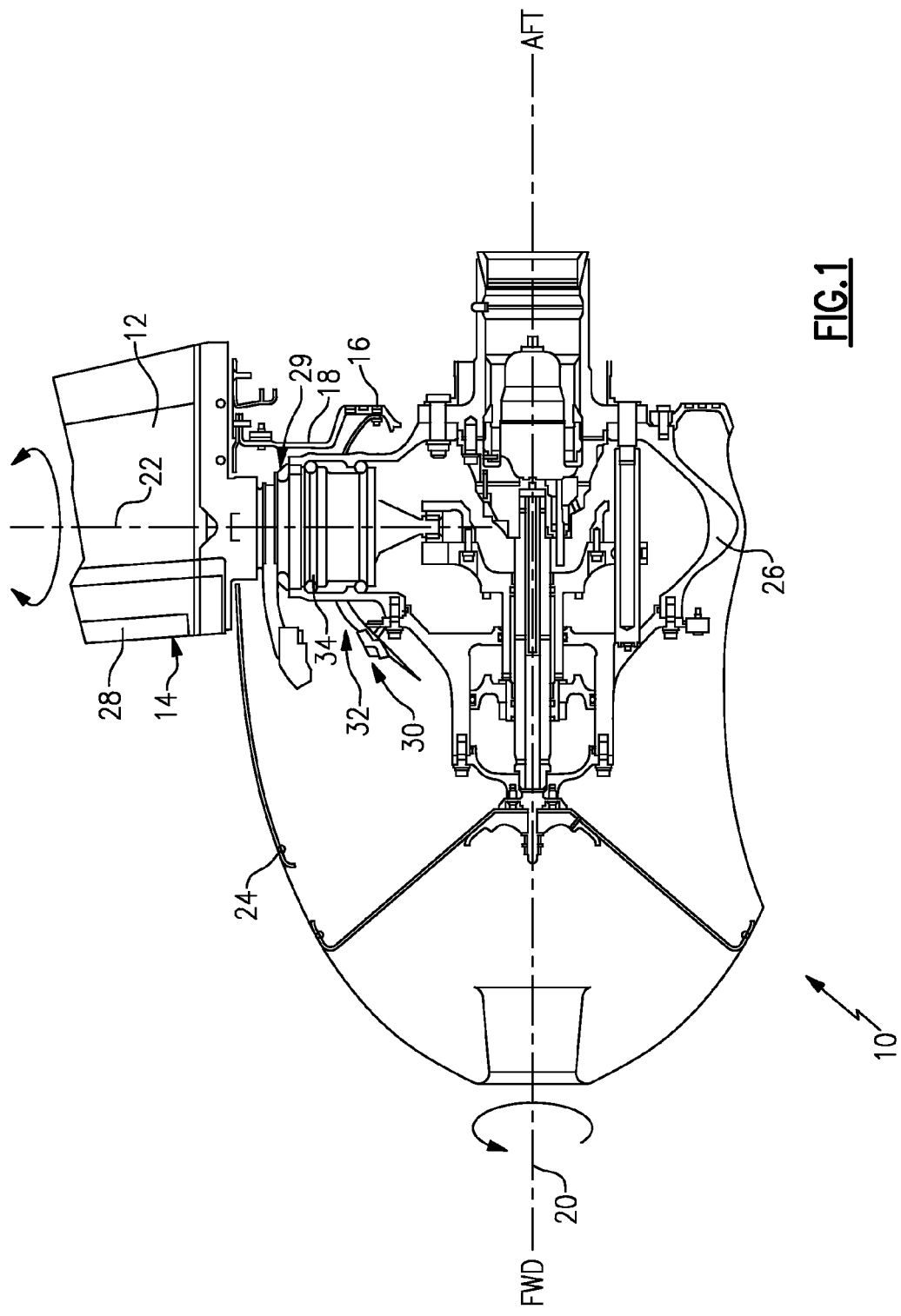
FIG. 1 is a sectional view of an example propeller assembly.

Referring to FIG. 1, a propeller assembly 10 includes a plurality of blades 12 (only one shown here) rotated about a first axis 20. The propeller blades 12 are supported by a double row ball bearing arrangement 34, installed between the hub 26 and blade 12 when the blades 12 are centrifugally loaded in the radial outward direction. A retaining ring 29 supports the blade 12 in the radial inward direction during static and low propeller rotational speed operation that results in a centrifugal force that is less than the blade weight.

The propeller blade 12 rotation about a second axis 22 provides for changes to the propeller blade pitch. Each of the propeller blades 12 include a leading edge 14 on which is attached a heating element 28. The example heating element 28 includes a rubber mat bonded to a leading edge of the blade 12. The rubber mat includes embedded resistive heating elements. Electrical energy required to power the resistive elements is communicated through heater leads 32. Two heater leads 32 are provide for each blade 12 such that for an assembly that includes eight propeller blades 12, sixteen heater leads 32 would be provided. In the illustrated example, only two heater leads 32 are shown.

The propeller assembly 10 rotates about the axis 20. Accordingly, each of the blades 12 rotates about the axis 20 and are also rotatable about the axis 22 to vary the propeller blade pitch. Accordingly, the heater leads 32 are configured to accommodate the relative movement of the propeller blades 12 about the axis 22 relative to adjoining elements that rotate about the axis 20.

Figure 2:
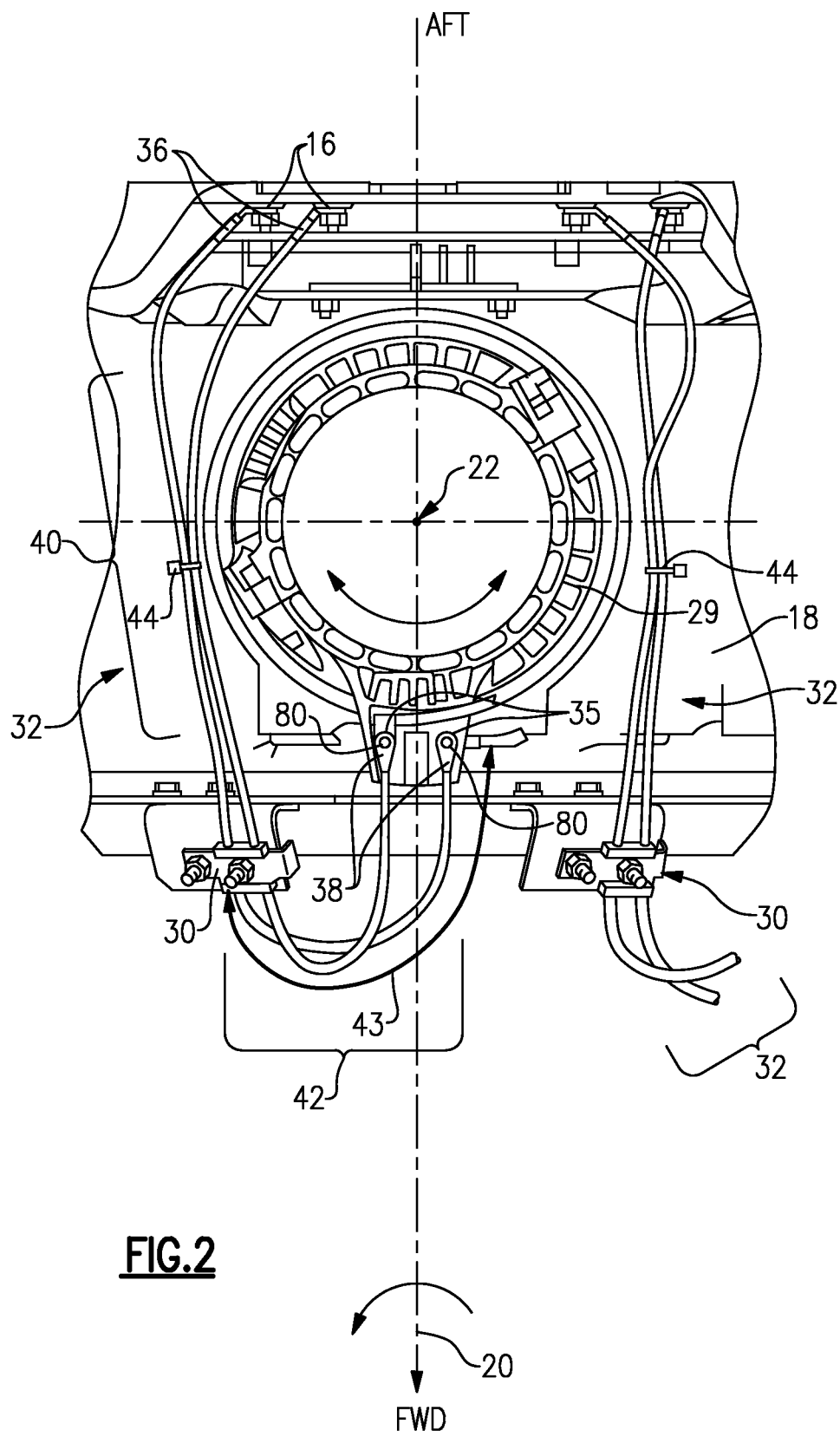
FIG. 2 is a top view of the example propeller assembly.

Each of the heater leads 32 is attached to a bulkhead 18 mounted slip ring terminal 16 on one end and to a terminal 35 disposed on the retaining ring 29 (Best shown in FIG. 2). A clamp 30 holds a portion of the heater leads 32 to constrain a portion of each of the heater leads 32 relative to movement of the retainer ring 29.

Referring to FIG. 2 with continued reference to FIG. 1, the heater leads 32 each include a static portion 40 and a dynamic portion 42. Heater leads 32 that correspond to one of the blades 12 are clipped together by clip 44 at an intermediate location along the static portion 40. As appreciated, the heater leads 32 all rotate with the propeller assembly 10, however, the static portion 40 remains fixed relative to the rotating blade 12 during pitch change operation. In contrast, the dynamic portion 42 is disposed between the fixed clamp 30 and the moving retainer ring terminals 35.

The retainer ring terminals 35 rotate with the retainer ring 29 about the axis 22 to accommodate the desired variations in propeller blade pitch. Accordingly the length of the dynamic portion 42 is required to accommodate the extreme limits of movement to assure the fully reversing forced displacement of the terminal connection does not result in an overstress condition. Rotation of the propeller assembly 10 also imparts centrifugal forces on the heater leads 32 that can contribute to undesired fatigue and stress. The example heater leads 32 include dimensional features that provide the desired performance and durability.

Referring to FIGS. 3 and 4 with continued reference to FIG. 2, an example heater lead 32 is shown that includes a conductive cable 54 that is coated with an insulating coating 52. The conductive cable 54 includes a first terminal lug 36 and a second terminal lug 38 that are attached to the conductive cable 54. Each of the terminal lugs 36, 38 include an opening 46 for a fastener 80 (FIG. 2) to provide attachment and electrical conduction. The example first terminal lug 36 is angled relative to a centerline of the heater lead 32 to facilitate attachment to the slip ring terminal 16. The example lead 32 includes an overall length 45 that is comprised of the static portion 40 and the dynamic portion 42. In this non-limiting embodiment, the overall length is 28.125 inches (71.4 cm). A length 41 of the static portion 40 provides for the heater lead 32 to extend between the slip ring terminals 16 to the clamp 30.

A length 43 of the dynamic portion 42 extends from the fixed clamp 30 to the retainer terminals 35 disposed on the retaining ring 29. The length 43 of the dynamic portion 42 is determined to reduce reverse loading on the second terminal lug 38 during movement between extremes of blade movement. Moreover, the dynamic portion 42 includes a stiffness that is determined to reduce load transfer to the terminal lugs 36, 38. The stiffness of the dynamic portion 42 is different than the stiffness of the static portion 40. The dynamic portion 42 includes a plurality of stiffeners 56 that are attached according to a defined spacing from the second terminal lug 38. The length 43 of the dynamic portion 42 along with the stiffeners 56 and defined spacing provide the desired range of movement for the blade 12 while providing the desired durability and service life. The stiffeners 56 also function as "bumpers" to protect the heater lead 32 from possible contact with portions of the propeller spinner 24 when centrifugally loaded during propeller operation The disclosed dynamic portion 42 in one non-limiting dimensional embodiment includes the length 43 of 14.250 inches (36.2 cm). Moreover, the length 43 of the dynamic portion is such that the overall length 45 and the length 43 of the dynamic portion 42 define a ratio between 1.49:1 and 1.51:1.

The length 43 of the dynamic portion 42 is determined from a center of the opening 46 to a front edge 50 of the protective cover 48 used to locate the heater lead 32 in the clamp 30. The protective cover 48 is placed in the clamp 30 to fix one end of the dynamic portion 42. The disclosed protective cover 48 includes an adhesive backing that affixes the protective cover 48 to the heater lead 32 and maintains the desired spacing from the second terminal lug 38. In this non-limiting dimensional embodiment the protective cover 48 includes a length 70 of 1.25 inches (3.175 cm). The length 70 is received within the clamp 30 and may vary to provide additional protection to the heater lead 32 within the clamp 30.

The stiffness of the dynamic portion 42 is provided in part by the cable 54 and insulating coating 52 and in part by the plurality of stiffeners 56. The plurality of stiffeners 56 are disposed within a stiffening length 62 that is shorter than the length 43 of the dynamic portion 42. The length 43 of the dynamic portion 42 and the stiffening length 62 define a ratio between 0.34:1 and 0.41:1. This ratio of stiffening length 62 to dynamic portion length 43 provides the desired stiffness that maintains the dynamic portion 42 in a desired orientation during operation and movement. Moreover, the plurality of stiffeners 56 varies the stiffness of the heater lead 32 within the dynamic portion 42 to reduce the effects of loading on the heater lead 32.

The stiffening length 62 is measured from the opening 46 to the farthest edge of the last of the plurality of stiffeners 56. Each of the example stiffeners 56 are of a common length 60 and spaced apart from each other a common distance 58. The combination of the length 60 and spacing 58 combine to define the stiffening length 62. The number of spacers in this disclosed non-limiting embodiment is four. Moreover, the ratio of spacers to unit length within the dynamic portion defines a ratio between 1:3 to 1:4 spacers. The spacing 58 between the stiffeners 56 contribute to the desired stiffness of the dynamic portion 42. In this non-limiting example, each of the spacings 58 between the stiffeners 56 defines a ratio in view of the overall stiffening length 62 between 0.09:1 and 0.08:1. The length of the spacing 58 combined with the length of each of the stiffeners 56 combine to determine and define the stiffening length 62.

In addition to modifying the stiffness in the dynamic portion 42, the plurality of stiffeners 56 protect the insulating coating 52 from potential abrasion and damage that could be caused by rubbing against the propeller spinner 24 that the leads are centrifugally loaded against during propeller operation.

A first strain relief sheath 66 is applied over the first terminal lug 36 and a portion of the cable 54 and a second strain relief sheath 64 is applied over the second terminal lug 38 and a portion of the cable 54 in the dynamic portion 42. The example first and second sheaths 66, 64 are adhesively backed and secured to the heater lead 32. Each sheath 64, 66 are of length 76 and extend from the corresponding terminal lug 36, 38 and onto the cable 54. As appreciated, the strain relief sheaths 64 and 66 are adhered to the insulating coating 52 that surround the cable 54.

Each of the heater leads 32 includes an outermost covering 78 that extends continuously from the first strain relief sheath 66 to the second strain relief sheath 64. The distance 74 combined with the overlap length 76 combine to provide that each sheath 66, 64 is overlapped by the covering 78. The outermost covering 78 provides a final abrasion protection layer for the heater lead 32. Moreover, the outermost covering 78 provides protection against fluids and oils that may be encountered during operation to further protect the heater leads 32 and extend operational life.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. An electrical lead for a propeller resistive heating system comprising:
    a first terminal lug and a second terminal lug, wherein the first terminal lug and the second terminal lug are attached at distal ends of an electrically conductive cable, and
    a protective cover disposed on the conductive cable having an edge spaced a first length from the second terminal lug to define a dynamic portion of the electrical lead, wherein a ratio of an overall length between the first terminal lug and the second terminal lug and the first length is between 1.49 and 1.51:1.

2. The electrical lead as recited in claim 1, wherein the electrically conductive cable is covered in an insulating material and the protective covering is attached to an outer surface of the insulating material.

3. The electrical lead as recited in claim 1, wherein the first length comprises a length of approximately 14.250 inches (36.195 cm).

4. The electrical lead as recited in claim 2, wherein the protective covering comprises a length less then the first length that extends from the edge toward the first terminal lug away from the second terminal lug.

5. The electrical lead as recited in claim 3, wherein the protective covering comprises a length of approximately 1.25 inches (3.175 cm).

6. The electrical lead as recited in claim 1, including a plurality of stiffeners disposed within the first length, wherein each of the plurality of stiffeners are spaced a distance from each other for modifying a desired flexibility of the dynamic portion of the electrically conductive cable.

7. The electrical lead as recited in claim 6, wherein the plurality of stiffeners are disposed within a stiffening length less than the first length, the stiffening length and the first length define a ratio between 0.34:1 and 0.41:1.

8. The electrical lead as recited in claim 6, wherein the plurality of stiffeners comprises a number of stiffeners related to a length of the first length according to the ratio between 1:3 and 1:4 spacers to unit length.

9. The electrical lead as recited in claim 7, wherein the stiffening length comprises a length of each of the plurality of stiffeners and a first spacing between the plurality of stiffeners, wherein the first spacing and the stiffening length define a ratio between 0.09:1 and 0.0887:1.

10. The electrical lead as recited in claim 1 including an adhesive sheath applied over each of the first and second terminal lugs and a portion of the conductive cable.

11. A propeller assembly comprising:
 a hub rotatable about a first rotational axis;
 a plurality of propeller blades attached to the hub and rotatable about a second axis transverse to the first rotational axis for adjusting a pitch of the propeller blades;
 a resistive heating system including an electric heating element disposed in each of the plurality of propeller blades; and
 a corresponding plurality of heater leads for communicating electric energy to each of the electric heating elements, each of the plurality of heater leads including a first terminal lug and a second terminal lug attached at distal ends of an electrically conductive cable, and a protective covering disposed on the conductive cable having an edge spaced a first length from the second terminal lug to define a dynamic portion of the electrical lead, wherein a ratio of an overall length between the first terminal lug and the second terminal lug and the first length is between 1.49 and 1.51:1.

12. The propeller assembly as recited in claim 11, wherein the first length comprises a length of approximately 14.250 inches (36.195 cm).

13. The propeller assembly as recited in claim 11, including a plurality of stiffeners disposed within the first length, wherein each of the plurality of stiffeners are spaced a distance from each other for modifying a desired flexibility of the dynamic portion of the electrically conductive cable.

14. The propeller assembly as recited in claim 13, wherein the plurality of stiffeners are disposed within a stiffening length less than the first length, the stiffening length and the first length define a ratio between 0.34:1 and 0.41:1.

15. The propeller assembly as recited in claim 14, wherein the plurality of stiffeners comprises a number of stiffeners related to a length of the first length according to the ratio between 1:3 and 1:4 spacers to unit length.

16. A method of installing an electrical lead for a propeller resistive heating system comprising:
 providing an electrically conductive cable including a first terminal lug and a second terminal lug at distal ends and a protective cover disposed on the conductive cable having an edged spaced a first length from the second terminal lug to define a dynamic portion of the electrically conductive cable; wherein a ratio of an overall length between the first terminal lug and the second terminal lug and a length of the dynamic portion is between 1.49:1 and 1.51:1;
 attaching a first terminal lug of an electrically conductive cable to a slip ring terminal;
 clamping the electrically conductive at the protective cover; and
 attaching the second terminal lug of the electrically conductive cable to a movable blade support ring such that the dynamic portion of the electrically conductive cable is movable to accommodate movement of the movable blade support.

17. The method of installing an electrical lead as recited in claim 16, including installing a plurality of stiffeners to the dynamic portion of the electrically conductive cable to define a desired stiffness of the dynamic portion different than other portions of the electrically conductive cable.

18. The method of installing an electrical lead as recited in claim 17, including spacing the plurality of stiffeners apart from each other within the dynamic portion of the cable to define a stiffening length.

19. The method of installing an electrical lead as recited in claim 16 including attaching an adhesive backed sheath over a portion of each terminal lug and a portion of the electrically conductive cable.

20. The method of installing an electrical lead as recited in claim 16, including attaching a first and second electrically conductive leads between the slip ring terminal and the movable support ring.

* * * * *

UNITED STATES PATENT AND TRADEMARK OFFICE
CERTIFICATE OF CORRECTION

| | | |
|---|---|---|
| PATENT NO. | : 8,890,032 B2 | Page 1 of 1 |
| APPLICATION NO. | : 12/884597 | |
| DATED | : November 18, 2014 | |
| INVENTOR(S) | : Gary L. Pruden | |

It is certified that error appears in the above-identified patent and that said Letters Patent is hereby corrected as shown below:

IN THE CLAIMS:

In claim 16, column 6, line 22; after "conductive" insert --cable--

Signed and Sealed this
Seventeenth Day of March, 2015

Michelle K. Lee
*Director of the United States Patent and Trademark Office*